(12) United States Patent  
Sirkett et al.

(10) Patent No.: US 8,845,338 B2
(45) Date of Patent: Sep. 30, 2014

(54) SYSTEM FOR ELECTRICALLY CONNECTING A TOOL TO A ROBOT WRIST AND A METHOD THEREFOR

(75) Inventors: Daniel Sirkett, Vasteras (SE); Jan-Erik Nahls, Vasteras (SE)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 13/598,241

(22) Filed: Aug. 29, 2012

(65) Prior Publication Data

US 2013/0012053 A1   Jan. 10, 2013

Related U.S. Application Data

(63) Continuation of application No. PCT/EP2010/052579, filed on Mar. 2, 2010.

(51) Int. Cl.
*H01R 39/00* (2006.01)

(52) U.S. Cl.
USPC .......................................................... 439/15

(58) Field of Classification Search
USPC ................. 74/490.01–490.06; 439/15, 16
See application file for complete search history.

(56) References Cited

U.S. PATENT DOCUMENTS

| 4,676,142 | A | | 6/1987 | McCormick et al. | |
|---|---|---|---|---|---|
| 4,844,359 | A | * | 7/1989 | Kato | 242/402 |
| 5,098,253 | A | | 3/1992 | Du et al. | |
| 5,957,711 | A | * | 9/1999 | Tanaka et al. | 439/164 |
| 5,980,285 | A | * | 11/1999 | Matsumoto | 439/164 |
| 5,993,229 | A | * | 11/1999 | Tanaka et al. | 439/164 |
| 6,022,230 | A | * | 2/2000 | Matsumoto | 439/164 |
| 6,042,405 | A | * | 3/2000 | Masuda et al. | 439/164 |
| 6,053,742 | A | * | 4/2000 | Matsumoto et al. | 439/15 |
| 6,099,331 | A | * | 8/2000 | Kikkawa et al. | 439/164 |
| 6,116,930 | A | * | 9/2000 | Sakata | 439/164 |
| 6,213,797 | B1 | * | 4/2001 | Best et al. | 439/164 |
| 6,264,487 | B1 | * | 7/2001 | Taniuchi et al. | 439/164 |
| 6,299,454 | B1 | * | 10/2001 | Henderson et al. | 439/19 |
| 6,341,969 | B1 | * | 1/2002 | Taniuchi et al. | 439/164 |

(Continued)

FOREIGN PATENT DOCUMENTS

| EP | 1287952 A1 | 3/2003 |
|---|---|---|
| GB | 2118522 A | 11/1983 |

(Continued)

OTHER PUBLICATIONS

International Preliminary Report on Patentability; Application No, PCT/EP2010/052579; Issued: May 14, 2012; 9 pages.

(Continued)

*Primary Examiner* — Ross Gushi
(74) *Attorney, Agent, or Firm* — St. Onge Steward Johnston & Reens LLC

(57) ABSTRACT

A system for electrically connecting a tool to a robot wrist. The system includes a first component being a tool flange arranged for rotation around a robot axis, and a second component, which includes an electric cabling and a connector permanently connected to each other. The connector has a plurality of poles and the electric cabling includes a plurality of conductors. Each conductor is permanently connected to a respective pole. The tool flange and the connector are mutually adapted for attaching the connector to the tool flange. According to the invention the tool flange has eccentric mounting means arranged for eccentric attachment of the connector on the tool flange.

17 Claims, 4 Drawing Sheets

(56) References Cited

U.S. PATENT DOCUMENTS

| | | | |
|---|---|---|---|
| 6,368,127 B1* | 4/2002 | Araki et al. | 439/164 |
| 6,409,527 B1* | 6/2002 | Adachi et al. | 439/164 |
| 6,435,886 B2* | 8/2002 | Oguma | 439/164 |
| 6,462,290 B1* | 10/2002 | Matsumoto | 200/61.54 |
| 6,494,396 B2* | 12/2002 | Sugata | 242/388.5 |
| 6,579,103 B2* | 6/2003 | Araki | 439/15 |
| 6,641,415 B2* | 11/2003 | Maegawa | 439/164 |
| 6,644,978 B2* | 11/2003 | Araki | 439/15 |
| 6,715,707 B2* | 4/2004 | Sakata | 242/388 |
| 6,733,300 B2* | 5/2004 | Oguma | 439/15 |
| 6,736,645 B2* | 5/2004 | Kato et al. | 439/15 |
| 6,764,326 B2* | 7/2004 | Matsumoto et al. | 439/164 |
| 6,788,018 B1* | 9/2004 | Blumenkranz | 318/568.11 |
| 6,796,801 B2* | 9/2004 | Hayashi | 439/15 |
| 6,843,672 B2* | 1/2005 | Kato et al. | 439/164 |
| 6,945,814 B2 | 9/2005 | Snape et al. | |
| 6,962,497 B2* | 11/2005 | Wade et al. | 439/15 |
| 6,979,200 B2* | 12/2005 | Ritchie | 439/15 |
| 7,175,453 B2* | 2/2007 | Yajima et al. | 439/164 |
| 7,175,454 B2* | 2/2007 | Araki et al. | 439/164 |
| 7,445,451 B2* | 11/2008 | Tanaka et al. | 439/15 |
| 7,762,825 B2* | 7/2010 | Burbank et al. | 439/247 |
| 7,775,800 B2* | 8/2010 | Reischl et al. | 439/15 |
| 7,798,816 B2* | 9/2010 | Oishi | 439/15 |
| 7,811,108 B2* | 10/2010 | Oishi et al. | 439/164 |
| 7,854,615 B1* | 12/2010 | Kachline et al. | 439/13 |
| 7,934,931 B2* | 5/2011 | Kuroda et al. | 439/15 |
| 8,066,524 B2* | 11/2011 | Burbank et al. | 439/247 |
| 8,083,525 B2* | 12/2011 | Fiala et al. | 439/15 |
| 8,414,303 B2* | 4/2013 | Nakamura et al. | 439/15 |
| 8,529,272 B2* | 9/2013 | Kamiya | 439/15 |
| 8,544,360 B2* | 10/2013 | Liu et al. | 74/490.02 |
| 8,585,420 B2* | 11/2013 | Burbank et al. | 439/247 |
| 2002/0094700 A1* | 7/2002 | Kato et al. | 439/15 |
| 2004/0053517 A1* | 3/2004 | DuRocher et al. | 439/15 |
| 2006/0101937 A1* | 5/2006 | Salomonsson et al. | 74/490.02 |
| 2007/0004236 A1* | 1/2007 | Suenaga | 439/15 |
| 2007/0142970 A1* | 6/2007 | Burbank et al. | 700/251 |
| 2007/0142971 A1* | 6/2007 | Schena | 700/251 |
| 2008/0057741 A1* | 3/2008 | Inotsuka | 439/15 |
| 2008/0156137 A1 | 7/2008 | Larsson et al. | |
| 2008/0188093 A1* | 8/2008 | Jaeger | 439/13 |
| 2008/0254646 A1* | 10/2008 | Reischl et al. | 439/15 |
| 2008/0268661 A1* | 10/2008 | Mitsui | 439/15 |
| 2011/0136376 A1* | 6/2011 | Johnson et al. | 439/529 |
| 2013/0012053 A1* | 1/2013 | Sirkett et al. | 439/460 |
| 2013/0059467 A1* | 3/2013 | Johnson et al. | 439/577 |
| 2013/0260606 A1* | 10/2013 | Hahakura et al. | 439/534 |
| 2013/0340560 A1* | 12/2013 | Burridge et al. | 74/490.05 |

FOREIGN PATENT DOCUMENTS

| | | |
|---|---|---|
| GB | 2292365 A | 2/1996 |
| JP | 3117584 A | 5/1991 |
| JP | 2002079487 A | 3/2002 |
| WO | 03015998 A1 | 2/2003 |

OTHER PUBLICATIONS

International Search Report and Written Opinion of the International Searching Authority; Application No. PCT/PCT/EP2010/052579; Issued: Nov. 23, 2010; Mailing Date: Nov. 30, 2010; 10 pages.

* cited by examiner

SYSTEM FOR ELECTRICALLY CONNECTING A TOOL TO A ROBOT WRIST AND A METHOD THEREFOR

CROSS-REFERENCE TO RELATED APPLICATIONS

The present application is a continuation of pending International patent application PCT/EP2010/052579 filed on Mar. 2, 2010 which designates the United States and the content of which is incorporated herein by reference.

FIELD OF THE INVENTION

The present invention in a first aspect relates to a system for electrically connecting a tool, such as a gripper or the like, to a robot wrist, which system includes a first component being a tool flange arranged for rotation around a robot axis, and a second component, which second component includes an electric cabling and a connector permanently attached to each other, the connector having a plurality of poles and the electric cabling having a plurality of conductors, each conductor being permanently connected to a respective of the poles, the tool flange and the connector being mutually adapted for attaching the connector to the tool flange.

The invention also relates to the individual components of such a system, to a robot wrist including the system and to an industrial robot including such a wrist.

In a further aspect the invention relates to a method for establishing electric connection through a plurality of conductors to a tool flange of a wrist on an industrial robot for establishing electric connection with a tool intended to be mounted on the tool flange, the tool flange being arranged for rotation around a robot axis.

BACKGROUND OF THE INVENTION

In an industrial robot there is an interface on the tool flange mounted on the wrist of the robot for the tool that is to be mounted thereon. This interface includes mechanical connection, electric connection and often also pneumatic connection. The present invention relates to the electric connection thereof. The electric connection normally includes a plurality of connectors that are to be individually and separately connected to a respective pole of the electric interface. To establish these connections conventionally is a time consuming operation since each individual conductor has to be mounted to its respective pole. The cabling that includes the conductors is also exposed to wear. It is therefore necessary to replace worn-out cabling at regular intervals, which accentuates the drawbacks with such a time consuming operation.

Various examples of how the connectors are arranged in relation to the tool flange are disclosed in U.S. Pat. No. 6,945,814, US 2008156137, EP 1287952 and JP 2002079487. However, none of these disclosures solves the problem how to provide the connections in a quick and safe way.

A step towards a more rational connection of the conductors to the respective poles is disclosed in WO 03015998, which relates to an industrial robot comprising a manipulator with a control system, where the manipulator comprises a hollow, first robot unit and a second robot unit rotatable around an axle. The first robot unit and the second robot unit are arranged for rotation and/or bending in relation to each other and the second robot unit includes a robot tool. Cables are drawn from through the first robot unit and arranged coaxially and detachably connected with a first end to the second robot unit via connection device. The connection device comprises a body, fixed to the first end of the cables in at least one wire and the body is arranged with sockets for connection of power supply to the robot tool.

This device however requires that the first robot part, i.e. the wrist, is hollow and that the cables are coaxial in relation to the axis. The use of a hollow wrist has the advantage that the cables and pneumatic tubing is protected from entanglement with human workers or other external objects. Since the cost for a hollow wrist is much higher than for a corresponding non-hollow wrist it is of interest to avoid entanglement by other means, which implies that the cabling cannot be drawn coaxially with the axis.

SUMMARY OF THE INVENTION

One object of the present invention is to solve the problem related to prior art in order to reduce the cost for establishing the electric connection, such that the mounting time is reduced and which is not limited by requiring costly components, such as wrists with hollow-shaft transmission.

This object is according to the first aspect of the invention achieved in that a system of the kind initially specified includes the specific features that the tool flange includes eccentric mounting means arranged for eccentric attachment of the connector on the tool flange, eccentric being related to said axis.

By the two components used for establishing the electric connection, where the connectors of the cabling terminate in a common connector that is attachable to the tool flange, the need for individual mounting of each connector is eliminated. Thereby a quick establishing of the electric connection with the interface on the tool flange is attained. Since the mounting means of the tool flange is eccentrically arranged, the system can be used for a wrist with non-hollow-shaft transmission and thereby to a wrist that is at a lower cost.

According to a preferred embodiment of the invented system, the connector includes a housing, the housing having a first portion attached to the electric cabling, the direction of the cabling where it is attached to this portion being different than the direction of the axis.

Together with the eccentric position of the connector when mounted on the tool flange, this embodiment offers a great freedom regarding how the electric cabling is drawn towards the tool flange. Thereby the extension of the electric cabling of the wrist can be optimized with regards to withstand the effects of being repeatedly rotated and other considerations.

According to a further preferred embodiment, the direction of the electric cabling where it is attached to the housing of the connector is substantially perpendicular to the direction of the axis.

When optimizing the drawing of the electric cabling in a non-hollow wrist, such a direction at the end attached to the connector housing is an advantageous adaption.

According to a further preferred embodiment, the direction of the electric cabling where it is attached to the housing of the connector is substantially tangential to the axis.

This allows the part of the cabling nearest the connector to be tangentially arranged within a shroud or a rearward directed outer wall of the tool flange around the wrist. Such geometry for this part of the electric cabling is particularly adapted for the cabling to travel between the extreme rotational positions without problems.

According to a further preferred embodiment, the conductors are mounted within the housing of the connector such that strain-relief is attained. This reduces the risk for loosening the contact between the contactor and its related pole when mounting the system or changing the cabling. It also reduces the risk that this fault will arise during operation due to the tension that might occur when the tool flange rotates.

According to a further preferred embodiment, the connector includes a circuit board with a front side having conductive pads forming said poles and a rear side having soldering pads to which the conductors are soldered.

Thereby the connector is formed by simple components that are easily assembled and which also provides a safe and reliable connection.

According to a further preferred embodiment, the connector consists of a circuit board with a front side having conductive pads forming said poles and a rear side, to which the conductors are directly connected, and which circuit board is arranged to be directly attached to the tool flange.

The circuit board forming the connector is thus mounted on the tool flange without being encapsulated in housing. This embodiment is advantageous for short production series, since it eliminates the need to manufacture a mould for the moulding of housing. Preferably the major part of the outer contour of the circuit board has a circular shape in order to fit into a circular recess in the tool flange.

According to a further preferred embodiment, the housing of the connector is of moulded plastic and encapsulates the end of the cabling and the rear side of the circuit board.

This construction of the connector provides a safe connection between the conductors and the poles and keeps the connections well protected.

According to a further preferred embodiment, the tool flange has a recess for mounting the connector, and the shape of the recess and the shape of the connector are complementary.

By the recess the position of the connector on the tool flange becomes well defined. Mounting the connector on the tool flange is very easy, and the risk for mistakes when mounting is negligible.

According to a further preferred embodiment, the recess extends from the periphery of the tool flange.

Through this location the position of the connector will be adapted to an electric cabling that terminates close to the periphery of the tool flange and thus is suitable when the end of the electric cabling extends tangentially inside a rearward directed flange on the periphery of thereof, which is an advantageous way of drawing the cable with respect to its possibility to rotate.

The invention also relates to a component to be used in the invented system, which component is the tool flange and has the specific feature that the tool flange includes mounting means arranged for eccentric attachment of an electric cabling connector to the tool flange.

According to preferred embodiments of the invented tool flange, it includes the features that are specified for the tool flange in the above mentioned preferred embodiments of the invented system.

The invention also relates to a second component to be used in the invented system, which second component includes an electric cabling and a connector permanently attached to each other, the connector having a plurality of poles and the cabling having a plurality of conductors, each conductor being permanently connected to a respective of said poles.

According to preferred embodiments of the invented second component, it includes the features that are specified for the second component in the above mentioned preferred embodiments of the invented system.

The invented robot wrist may include the first and second components of the invented system, in particular according to any of the above specified preferred embodiments thereof. The invented industrial robot may include the invented robot wrist.

Preferably, the wrist includes an inner wrist part and at least one manoeuvre connection means, which inner wrist part includes solid-shaft transmission components, which wrist further includes an inner shroud and an outer shroud, which inner shroud encloses the inner wrist part, whereby the electric cabling is arranged between the inner shroud and the outer shroud. The eccentric mounting of the connector on the tool flange is particularly useful in connection with this kind of wrist.

An object of the invention is also achieved in that a method of the kind initially specified includes the specific measures of providing an electric cabling including the plurality of conductors and having a pre-mounted connector with a plurality of poles connected to a respective of the conductors, providing a tool flange having eccentric mounting means, eccentric being related to said axis, and mounting the connector to said eccentric mounting means.

According to preferred embodiments of the invented method, the cabling provided and the tool flange provided have the features specified for these components in any of the above mentioned preferred embodiments of the invented system.

The invented components, robot wrist and industrial robot and the invented method have advantages corresponding to those of the invented system and the preferred embodiments thereof and which have been described above.

The above specified preferred embodiments of the various aspects of the invention are specified herein. It is to be understood that further preferred embodiments of course can be constituted by any possible combination of preferred embodiments above and by any possible combination of these and features mentioned in the description of examples below.

The invention will be further explained through the following detailed description of examples thereof and with reference to the accompanying drawings.

DETAILED DESCRIPTION OF THE INVENTION

Figure 1:
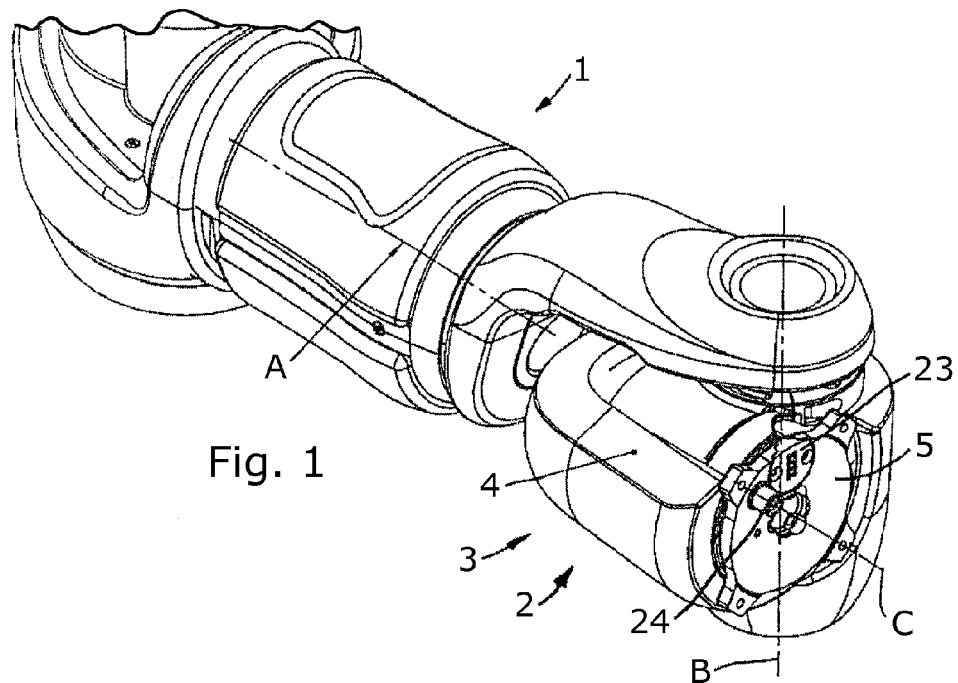
FIG. 1 is a perspective view of a robot arm with a wrist according to an example of the invention.

FIG. 1 shows the lower arm 1 of an industrial robot. The arm 1 is connected to a wrist 2 with a tool flange 5 for a robot tool (not shown). The figure shows the three final axes of rotation, the fourth axis A, the fifth axis B, and the sixth axis C. The gears and motors for axes five and six are housed within an encapsulated module 3, which is partially encased in soft padding 4. On the front side of the tool flange 5 there are connection means for control and power supply to the tool that is to be mounted thereon. The connection means include an outlet 24 for pneumatic tubing and a connector 23 for electric connection to the tool. The connector 23 is connected to cabling drawn through the wrist 2.

Figure 2:
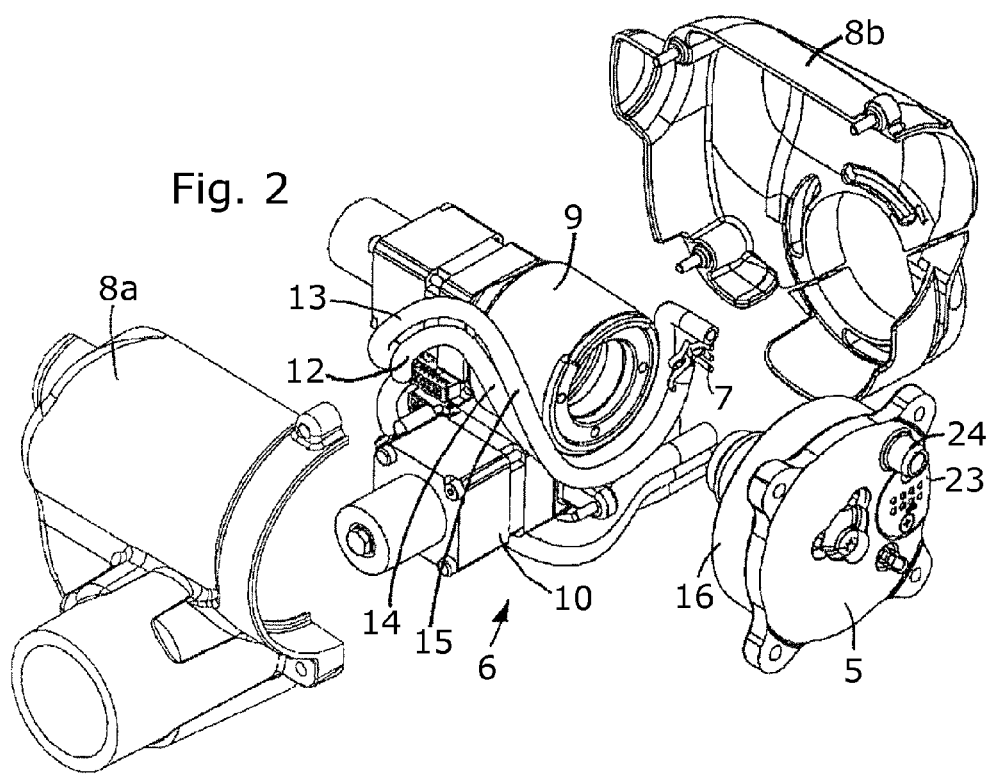
FIG. 2 is an exploded view in perspective of the wrist in FIG. 1.

In the perspective exploded view of FIG. 2 the main parts of the wrist 2, namely the inner part 6 thereof, an inner shroud 7, a first half 8*a* of an outer shroud, a second half 8*b* of the outer shroud and the tool flange 5. The outer shroud parts 8*a*, 8*b* are shown with the padding removed.

The inner part 6 of the wrist 2 has a casting 9 which houses the bearings and gears for the fifth and sixth axes. At the left side of the casting 9 the motor 10 for the fifth axis is mounted. The motor 11 for the sixth axis can be seen on the rear side of the casting 9. A pneumatic tubing 12 having a loop 14 extends from the rear side of the inner wrist part 6 to the front side thereof for connection to a tool that is to be mounted on the tool flange 5. From the rear side also an electric cabling 13 with a loop 15 extends to the side of the tool flange 2. The air tubing terminates in the axial direction with respect to the sixth axis, and the electric cabling 13 terminates in the tangential direction, and is tangentially directed for about 180° at its end.

When the parts seen in FIG. 2 are assembled the inner shroud 7 is located around the casting 9 and the motor 11 of the sixth axis, and with the pneumatic tubing 12 and the electric cabling 13 on the outside of this shroud 7. The tool flange 5 has a cylindrical wall 16 in the rearward direction. With the tool flange attached to the inner wrist part 6, the cylindrical wall thereof is located radially outside the inner shroud and radially outside the pneumatic tubing 12 and the electric cabling 13. The tangentially directed part of the electric cabling 13 thereby extends along the inside of that cylindrical wall 16. The outer shroud halves 8*a*, 8*b* are mounted to each other and enclose the pneumatic tubing 12 and the electric cabling 13 as well as the fifth axis motor 10. The front end of the outer shroud 8*a*, 8*b* extends on the outside of the cylindrical wall 16 of the tool flange 5.

On the front side of the tool flange 5 there is a connector 23 at which the electric cabling 13 terminates and through which electric connection to a tool is established. Also on the front side of the tool flange is a connection device 24 at which the pneumatic tubing terminates and is for the air supply to the tool.

Figure 3:
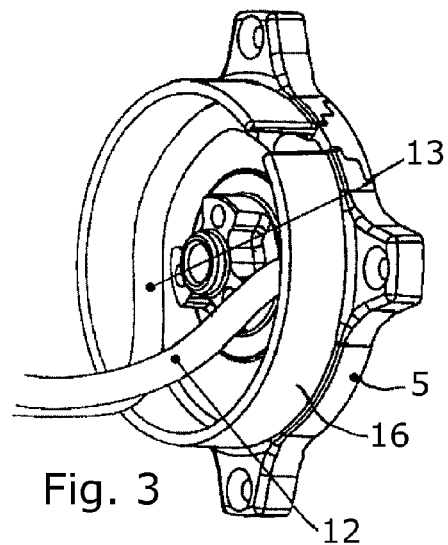
FIG. 3 is a perspective view of the rear side of the tool flange of the wrist illustrated in FIGS. 1 and 2.

FIG. 3 in a perspective view illustrates the tool flange 5 from the rear side, i.e. the side thereof that is facing the wrist 2. Within the cylindrical wall 16 of the tool flange 5 the ends of the pneumatic tubing 12 and the electric cabling 13 can be seen.

Figure 4:
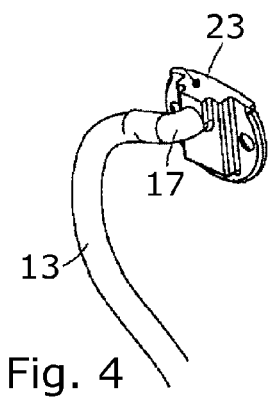
FIG. 4 is a perspective view of a detail of the wrist in FIGS. 1 and 2.

The electric cabling 13 terminates in a connector 23 illustrated in FIG. 4. The connector 23 includes a rearward directed portion 17 for the attachment to the electric cabling 13. This portion has a bend such that it turns the tangential direction of the electric cabling 13 into an axial direction in the connector 23.

Figure 5:
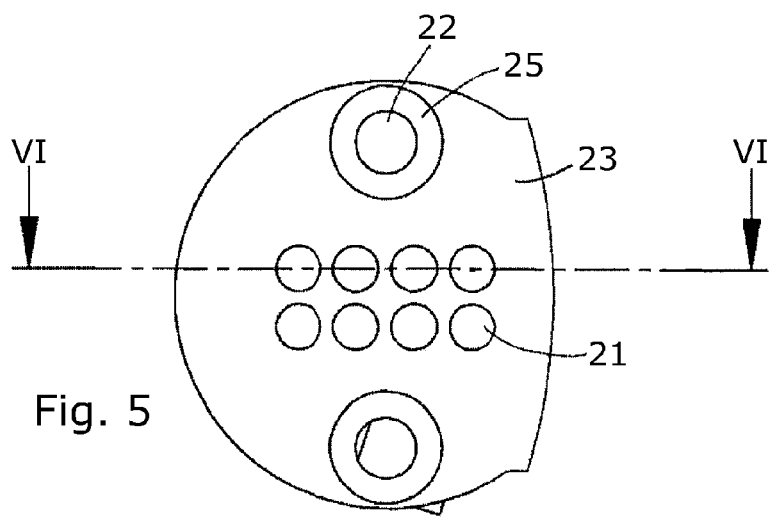
FIG. 5 is a front view of the detail of FIG. 4.

FIG. 5 is a front view of the connector 23, showing the side thereof that is directed towards the tool that is to be mounted on the tool flange. The connector has a plurality, in the illustrated example eight, conductive pads 21. These are the poles individually connected to a respective conductor of the electric cabling 13 and are to be connected to the tool. The connector has two through holes 22 with a respective recess 25 for mounting the connector 23 onto the tool.

Figure 6:
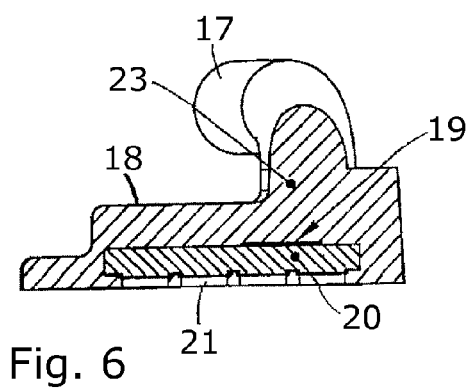
FIG. 6 is a section along the line VI-VI of FIG. 5.

FIG. 6 is a section through the connector 23. It has a housing 18 of moulded plastic that encapsulates the conductors (not shown) coming from the electric cabling 13 and encapsulates the rear side of a printed circuit board 20. On the rear side of the circuit board there are soldering pads 19, to which the conductors are individually soldered. On the front side of the circuit board 20 the conductive pads 21 can be seen.

Figure 7:
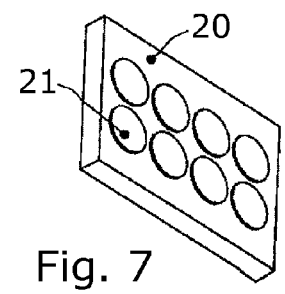
FIG. 7 is a perspective view of a part of the detail illustrated in FIGS. 5 and 6.

In FIG. 7 the circuit board 20 with its conductive pads forming the poles 21 is illustrated in a perspective view as seen from its front side.

Figure 8:
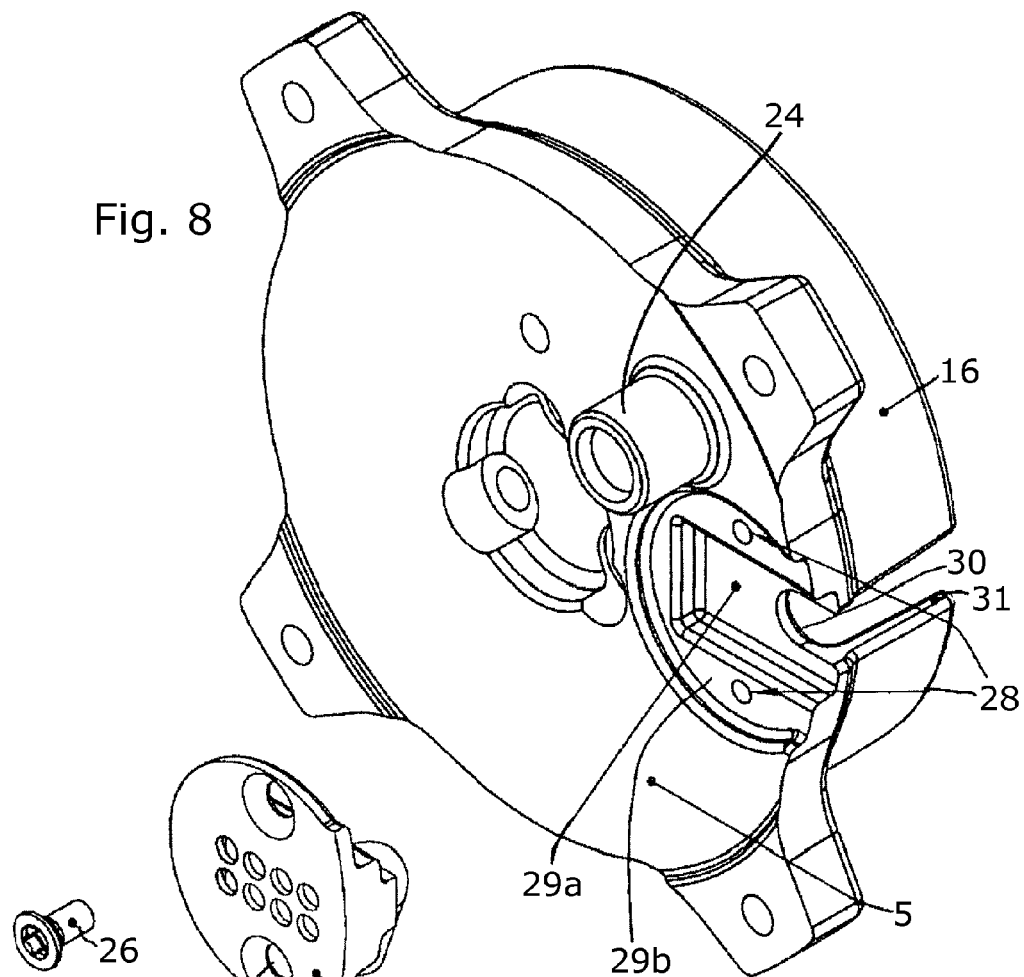
FIG. 8 is an exploded perspective view of components of the wrist illustrated in FIGS. 1 to 3.

FIG. 8 illustrates how the connector 23 is mounted in the tool flange 5. The connector is made as an insert that fits into a mounting means 29*a*, 29*b* that is in the form of a machined recess 29*a*, 29*b* on the front side of the tool flange 5. The recess has a deeper portion 29*a* and a more shallow portion 29*b* to adapt to the shape of the connector 23. The walls of the deeper portion 29*a* extend stepwise as do the corresponding part of the connector. At the bottom of the deeper recess 29*a* there is an axial opening through which the portion 17 with bend on the rear side of the connector 23 extends to meet the electric cabling 13. A slot 31 cut into the wall 16 of the tool flange 5 allows the electric cabling 13, which exits from the connector 23, to lie within the wall 16.

When the connector 23 is fitted into the recess 29*a*, 29*b*, mechanical fixation is achieved by means of two countersunk screws which pass through the clearance holes 22 in the connector 23 and into threaded holes 28 in the bottom of the shallow portion 29*b* of the recess.

Figure 9:
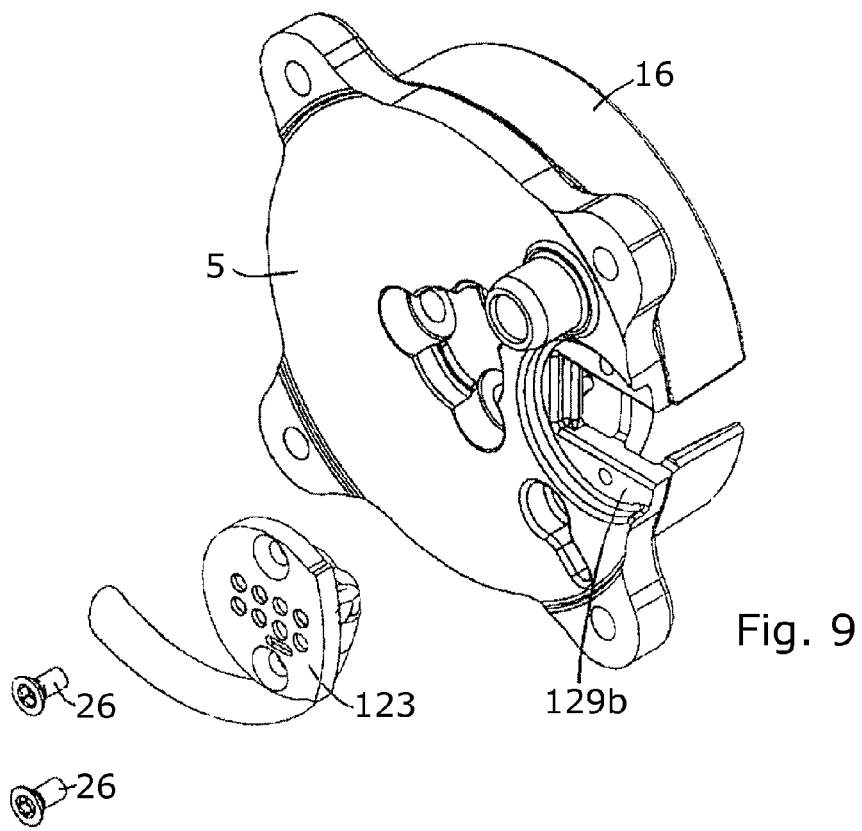
FIG. 9 is a perspective view of details of an alternative example.
Figure 10:
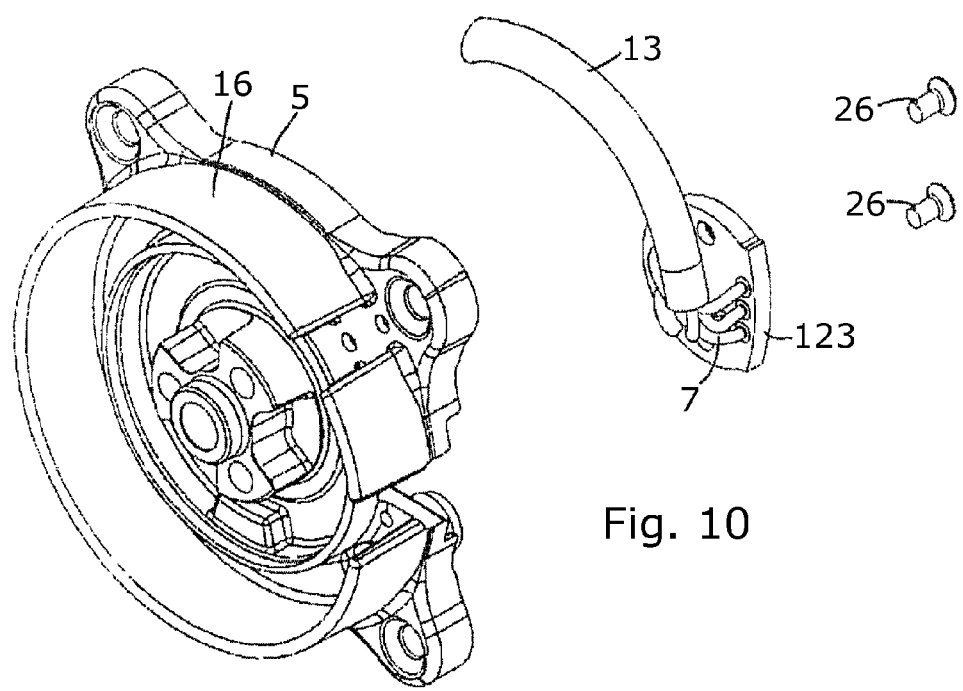
FIG. 10 is a perspective view of the details in FIG. 9 as seen from the opposite side.

In an alternative example depicted in FIGS. 9 and 10, details that are the same as those of the first example have the same reference numerals. The connector 123 in this example consists solely of a circuit board 123 with poles 21. The connector thus is shaped as a plate with a circular shape along a major part of its exterior. The recess 129*b* in the tool flange is shaped to match the shape of the connector. The recess 129*b* is deeper than the corresponding recess in FIG. 8, and the bottom of the recess 129*b* is not in steps as in FIG. 8.

As can be seen in FIG. 10, the conductors 7 of the electric cabling 13 are directly attached to the rear side of the circuit board 123.

Figure 11:
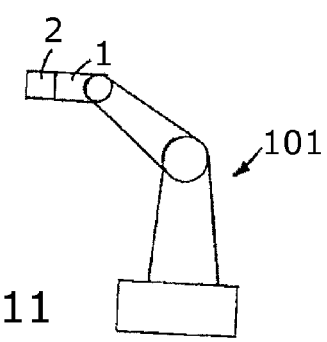
FIG. 11 is a schematic side view of an industrial robot according to the invention.

FIG. 11 illustrates an industrial robot 101 having a lower arm 1 with a wrist 2 according to the present invention.

What is claimed is:

1. A system for electrically connecting a tool to a robot wrist, which system includes a first component being a tool flange of a robot wrist arranged for rotation around a robot axis, and a second component, which second component includes an electric cabling and a connector permanently attached to each other, the connector having a plurality of poles and the electric cabling having a plurality of conductors, each conductor being permanently connected to a respective of said poles, the tool flange and the connector being mutually adapted for attaching the connector to the tool flange, wherein the tool flange includes eccentric mounting means arranged for eccentric attachment of the connector on the tool flange, eccentric being related to said axis, and that a side of the connector that is directed towards a tool mounted on the tool flange provides electric connection between such a tool and the connector by means of the plurality of poles of the connector, wherein the connector includes a circuit board with a front side having conductive pads forming said poles and a rear side having soldering pads to which the conductors are soldered.

2. The system according to claim 1, wherein the connector includes a housing, the housing having a first portion attached to the electric cabling, the direction of the electric cabling where it is attached to said portion being different than the direction of said axis.

3. The system according to claim 2, wherein said direction of the electric cabling is substantially perpendicular to the direction of said axis.

4. The system according to claim 3, wherein said direction of the electric cabling is substantially tangential with respect to said axis.

5. The system according to claim 1, wherein the conductors are mounted within the housing of the connector such that strain-relief is attained.

6. The system according to claim 1, wherein said housing is of moulded plastic and encapsulates the end of the electric cabling and the rear side of the circuit board.

7. The system according to claim 1, wherein the connector consists of a circuit board with a front side having conductive pads forming said poles and a rear side, to which the conductors are directly connected, and in that the circuit board is arranged to be directly attached to the tool flange.

8. The system according to claim 1, wherein the tool flange has a recess for mounting the connector and in that the shape of the recess and the shape of the connector are complementary.

9. The system according to claim 8, wherein the recess extends from the periphery of the tool flange.

10. A component adapted to be used in a system for electrically connecting a tool to a robot wrist, the component being a tool flange of a robot wrist arranged for rotation around a robot axis, which system includes a second component, which second component includes an electric cabling and a connector permanently attached to each other, the connector having a plurality of poles and the electric cabling having a plurality of conductors, each conductor being permanently connected to a respective of said poles, the tool flange and the connector being mutually adapted for attaching the connector to the tool flange, wherein the tool flange includes eccentric mounting means arranged for eccentric attachment of the connector to the tool flange, eccentric being related to said axis, and that a side of the connector that is directed towards a tool mounted on the tool flange provides electric connection between such a tool and the connector by means of the plurality of poles of the connector,
    wherein the connector includes a circuit board with a front side having conductive pads forming said poles and a rear side having soldering pads to which the conductors are soldered.

11. The component according to claim 10, wherein the tool flange has a recess for mounting the connector and in that the shape of the recess and the shape of the connector are complementary.

12. A second component adapted to be used in a system for electrically connecting a tool to a robot wrist, which second component includes an electric cabling and a connector permanently attached to each other, the connector having a plurality of poles and the electric cabling having a plurality of conductors, each conductor being permanently connected to a respective of said poles, which system includes a first component being a tool flange of a robot wrist arranged for rotation around a robot axis, the tool flange and the connector being mutually adapted for attaching the connector to the tool flange, wherein the tool flange includes eccentric mounting means arranged for eccentric attachment of the connector on the tool flange, eccentric being related to said axis, and that a side of the connector that is directed towards a tool mounted on the tool flange provides electric connection between such a tool and the connector by means of the plurality of poles of the connector,
    wherein the connector includes a circuit board with a front side having conductive pads forming said poles and a rear side having soldering pads to which the conductors are soldered.

13. The second component according to claim 12, wherein the connector includes a housing, the housing having a first portion attached to the electric cabling, the direction of the electric cabling where it is attached to said portion being different than the direction of said axis.

14. A robot wrist comprising a first and a second component of a system for electrically connecting a tool to the robot wrist, the first component being a tool flange of a robot wrist arranged for rotation around a robot axis, and the second component includes an electric cabling and a connector permanently attached to each other, the connector having a plurality of poles and the electric cabling having a plurality of conductors, each conductor being permanently connected to a respective of said poles, the tool flange and the connector being mutually adapted for attaching the connector to the tool flange, wherein the tool flange includes eccentric mounting means arranged for eccentric attachment of the connector on the tool flange, eccentric being related to said axis, and that a side of the connector that is directed towards a tool mounted on the tool flange provides electric connection between such a tool and the connector by means of the plurality of poles of the connector,
    wherein the connector includes a circuit board with a front side having conductive pads for said poles and a rear side having soldering pads to which the conductors are soldered.

15. An industrial robot, wherein the robot includes a wrist according to claim 14.

16. A method for establishing electric connection between a tool and a tool flange of a wrist on an industrial robot, the tool configured for mounting on the tool flange, the tool flange being arranged for rotation around a robot axis, said method comprising the steps of:
    providing an electric cabling including a plurality of conductors and having a pre-mounted connector with a plurality of poles connected to a respective of the conductors,
    providing a tool flange having eccentric mounting means, eccentric being related to said axis,
    mounting the connector to said eccentric mounting means, such that a side of the connector that is directed towards a tool mounted on the tool flange provides electric connection between such a tool and the connector by means of the plurality of poles of the connector, and
    providing, for the connector, a circuit board with a front side having conductive pads forming said poles and a rear side having soldering pads to which the conductors are soldered.

17. The method according to claim 16, wherein each conductor is permanently connected to a respective of said poles, the tool flange and the connector are mutually adapted for attaching the connector to the tool flange, and the eccentric mounting means of the tool flange is arranged for eccentric attachment of the connector on the tool flange.

\* \* \* \* \*